United States Patent [19]

Wright

[11] Patent Number: 4,555,217
[45] Date of Patent: Nov. 26, 1985

[54] ROBOT ARM WITH SPLIT WRIST MOTION
[75] Inventor: Allen J. Wright, Corvallis, Oreg.
[73] Assignee: Intelledex Incorporated, Corvallis, Oreg.
[21] Appl. No.: 690,828
[22] Filed: Jan. 11, 1985

Related U.S. Application Data
[63] Continuation of Ser. No. 456,310, Jan. 6, 1983, abandoned.
[51] Int. Cl.[4] .............................................. G05J 17/00
[52] U.S. Cl. ..................................... 414/735; 901/14; 901/28
[58] Field of Search .............................. 414/735, 729; 901/14–18, 28

[56] References Cited
U.S. PATENT DOCUMENTS
3,922,930 12/1975 Fletcher et al. .................. 74/665 B
4,367,532 1/1983 Crum et al. ....................... 901/15 X FOREIGN PATENT DOCUMENTS
75760  6/1977  Japan ............................... 414/735 X
203493  4/1966  Switzerland ....................... 901/18 X
865517  4/1961  United Kingdom .
1536788  12/1978  United Kingdom .
2115779A  7/1983  United Kingdom .

Primary Examiner—Robert J. Spar
Assistant Examiner—Donald W. Underwood

[57] ABSTRACT

A robot arm with upper and lower arm sections having shoulder, elbow and wrist joints. The shoulder joint is triaxial having a sweep axis, a swivel axis and a roll axis, the three axes being mutually perpendicular and intersecting at a point. The elbow joint has a single extension axis parallel to the swivel axis of the shoulder joint. The wrist joint has a pitch axis parallel to the elbow extension axis. Wrist roll motion is provided by roll motion of the shoulder joint so that the robot wrist may have low mass.

2 Claims, 6 Drawing Figures

ROBOT ARM WITH SPLIT WRIST MOTION

This is a continuation of application Ser. No. 456,310 filed on Jan. 6, 1983, now abandoned.

DESCRIPTION

1. Technical Field

The invention relates to robots and more particularly to a manner of providing motion to a robot wrist.

2. Background Art

A class of robots simulates the human arm from the shoulder to the wrist. Wrist motion in anthropomorphic robots simulates motion of the human wrist with regard to the number of degrees of freedom, as well as range of motion. FIG. 1 shows such a robot arm 11 of the prior art including a shoulder joint 13, an elbow joint 15 and a wrist joint 17. The wrist supports a tool interface 19, also known as an actuator. Wrist joint 17 is capable of providing three degrees of freedom. One such degree of freedom is pitch motion which is rotation about a first axis, indicated by arrows X. A second degree of freedom is roll motion about a Y axis, perpendicular to the X axis, indicated by the arrows Y. A third degree of freedom is about a third axis, perpendicular to the X and Y axes, known as yaw motion and indicated by the arrows Z. The elbow joint is provided with rotational motion about an axis which may be parallel to the first axis of the wrist. This rotation is indicated by the arrows T. Rotation of the shoulder may be about another parallel axis, indicated by the arrows S, while the entire arm may pivot about a base in a sweeping motion, indicated by the arrows R.

In positioning a robot arm, it is desirable to locate the arm as precisely as possible. This is usually accomplished by means of servo systems which sense the position of the wrist and then make appropriate corrections. Even with corrections, it is difficult to position a robot wrist or actuator which is vibrating. Vibration can be corrected by increasing rigidity of the arm. This however, increases mass and requires greater amounts of force for a given amount of arm acceleration.

An object of the invention has been to devise a robot arm and wrist which is less massive than prior wrists in anthropomorphic robot arms.

DISCLOSURE OF INVENTION

The above object has been met with a robot arm having a simplified wrist joint, with some of the wrist motion being transferred to the robot shoulder. Since motors and gears usually provide motive power for motion about an axis, shifting of an axis of rotation from the robot wrist to the robot shoulder means the simplification in wrist motion which eliminates a motor at the end of the robot arm. This savings in wrist mass means that smaller amounts of force can be used to achieve a given acceleration of the wrist. Besides the mass savings attributable to motor weight, there is an additional mass savings in a less massive arm necessary to achieve the required rigidity for accurate motion of the wrist.

BEST MODE FOR CARRYING OUT THE INVENTION

Figure 1:
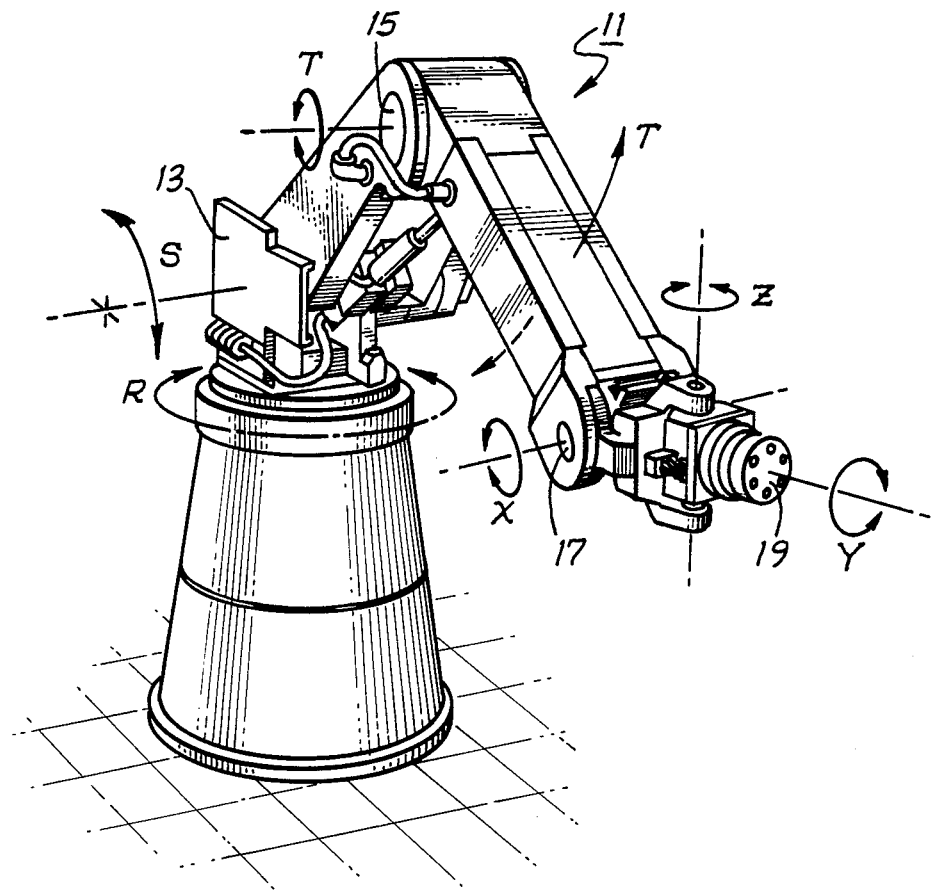
FIG. 1 is a perspective view of an anthropomorphic arm of the prior art.
Figure 2:
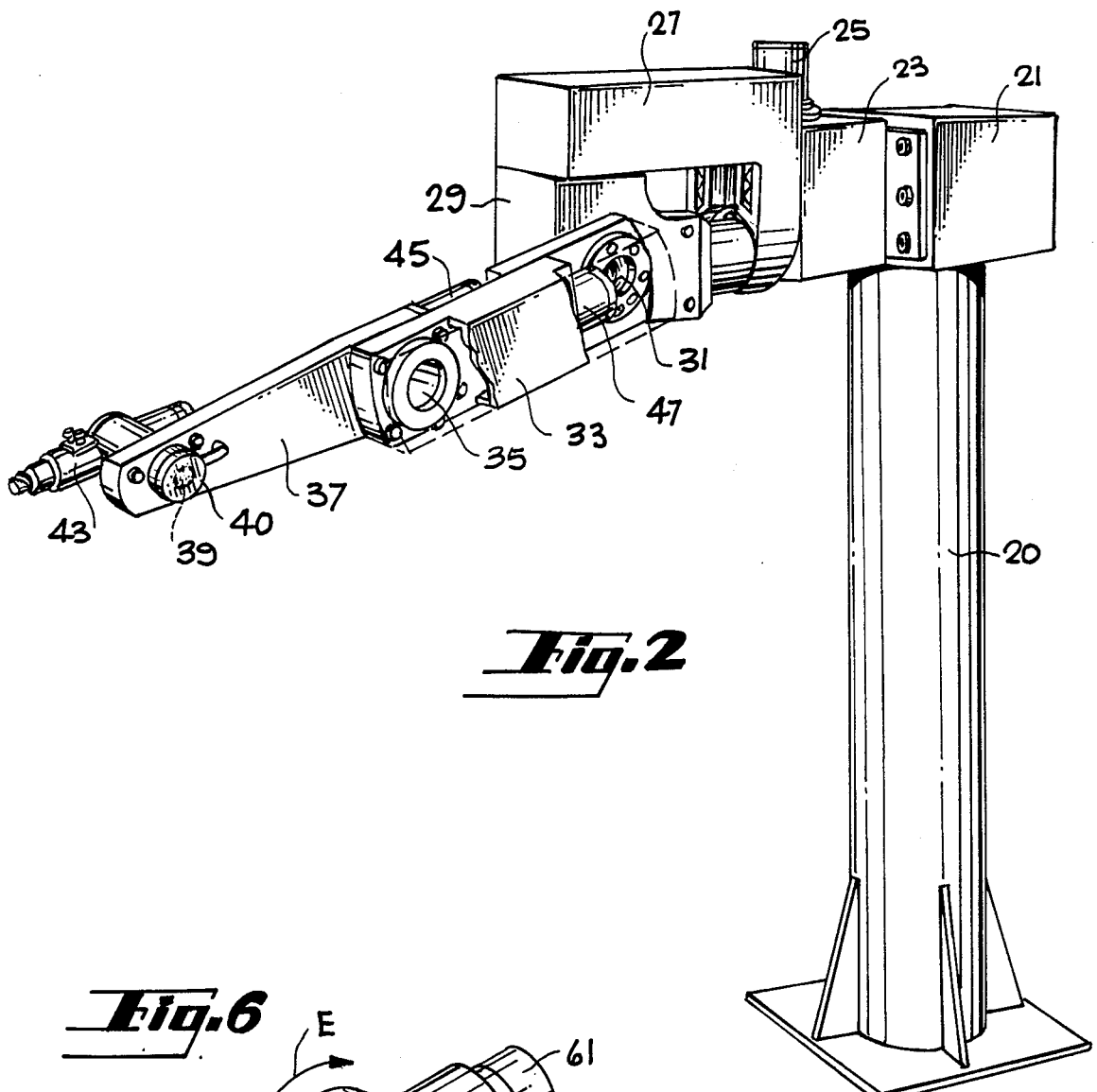
FIG. 2 is a perspective view of a robot arm in accord with the present invention.

With reference to FIG. 2, the robot arm and wrist of the present invention are shown. The robot arm includes a base 21 to which the robot shoulder is mounted. An optional stand 20 supports base 21. The arm could be mounted to a wall or the like. Use of the stand, may permit introduction of a second arm sweep axis of the type shown in FIG. 1 for faster arm movement. The shoulder is an assembly of joints, having several members which define the joints. A plate 23 supports a motor 25 atop the plate, with gearing and a shaft inside the plate defining one of the three shoulder axes. To this axis is rotatably mounted a first bracket 27 which also encloses a motor and gears. At a forward end, bracket 27 defines a vertical arm sweep axis to which a second bracket 29 is rotably mounted.

Second bracket 29 defines another axis, known as a swivel axis in the lower portion of the bracket. This axis has a shaft 31 extending therethrough to which an upper arm section 33 is connected. The upper arm section, also known as the home section is preferably a unitary member. However, a compound upper arm having two or more sections, connected at shaft joints could be provided. Upper arm section 33 has an elbow joint through which an arm extension axis is defined. A shaft 35 is mounted along this axis, connecting the lower arm section 37 to the upper arm section. In turn, the lower arm section has a wrist joint at its lower extremity through which a pitch axis is defined. The pitch axis has a shaft 39 mounted on a parallel axis with a shaft angle encoder 40 axially therewith for supporting a tool interface or actuator 43. A motor 45 mounted at the elbow, defines a spin axis for providing power to a tool which is mounted at the forward end. Shaft 39 includes a gear which is connected, immediately below motor 45, at the upper end of the arm for providing drive power to the shaft. Similarly, shaft 35 includes a gear which is driven by motor 47 housed within upper arm 33. These motors are stepper motors which respond to digital pulses transmitted along wires from base 21.

Figure 3:
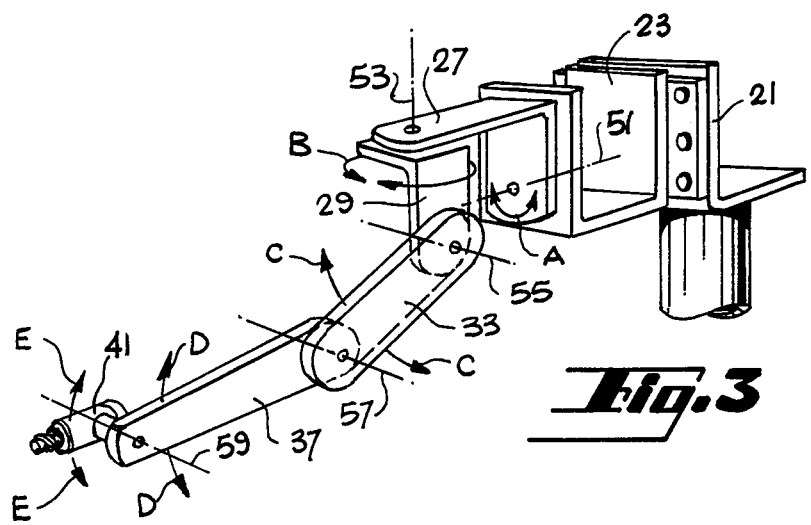
FIGS. 3–5 illustrate the several joints and axes of motion of the robot arm of FIG. 2.

The manner of providing wrist motion may be more clearly seen with reference to FIG. 3, which has simplified views of the joints, arm sections and axes of FIG. 2. The base 21 is seen to mount support plate 23 through which a first axis 51, a roll axis is defined. The roll axis provides rotation for bracket 27 as indicated by the arrows A. An upper outward portion of the bracket defines a second axis 53, an arm sweep axis, about which bracket 29 rotates, as indicated by the arrows B. The lower portion of bracket 29 defines a third shoulder axis 55, an arm swivel axis, about which upper arm 33 rotates as indicated by the arrows C.

The triaxial shoulder joint is such that roll axis 51, sweep axis 53 and swivel axis 55 are mutually perpendicular and intersect at a common point when the axes are extended in space. Preferably, the point is on shaft 31 which connects the upper arm 33 to bracket 29 along the swivel axis. Upper arm 33 has a joint at its extremity which is simply an extension axis 57, parallel to swivel axis 55. A shaft connecting lower arm 37 with upper arm 33 is coaxial with the extension axis such that the lower arm rotates about the extension axis in the directions indicated by the arrows D.

The lower extremity of lower arm 37 has a pitch axis 59 defined therethrough, wherein a shaft coaxial with the pitch axis is mounted for supporting the tool interface 43 for tip rotation indicated by the arrows E. Thus, wrist motion, as described thus far, is uniaxial, about the pitch axis. Range of the wrist is given by extension axis 57. Rotational tool positioning is achieved by means of a spin axis associated with the tool holder itself. However, absent from the wrist is the roll axis, indicated by the arrows Z in FIG. 1. Instead, roll is provided by the combination of the roll and sweep axes of the shoulder joint. In this manner, some of the wrist motion has been transferred to the shoulder joint. The tool interface or actuator 43 may still be positioned anywhere within its range, yet with a lesser load than with a more complicated wrist joint.

Figure 4:
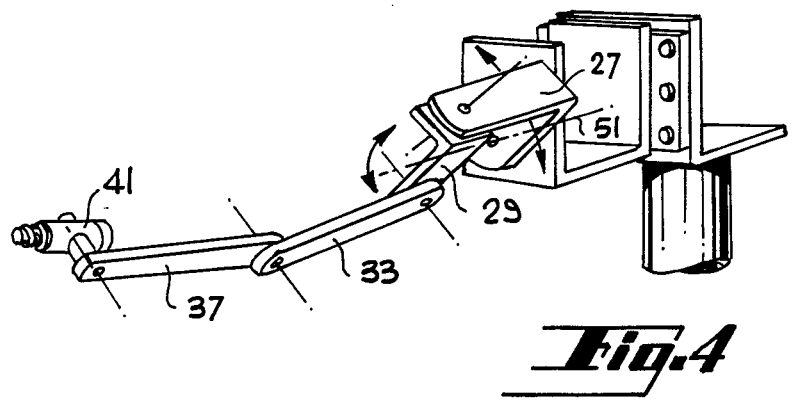
Figure 5:
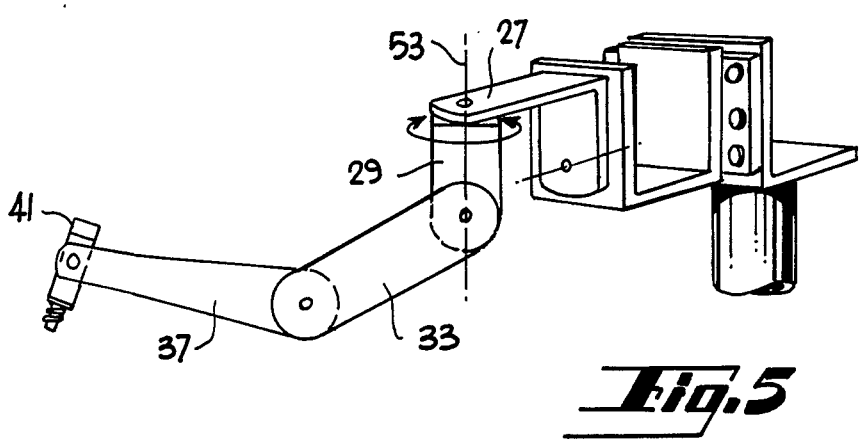

An example of actuator motion is given in FIGS. 4 and 5. In FIG. 4, bracket 27 is seen to have rotated about roll axis 51, while bracket 29 has remained relatively stationary, as with the upper arm 33, lower arm 37 and tool actuator 41. In FIG. 5, the bracket 27 has remained stationary, but bracket 29 is shown to have rotated about the sweep axis 53. There has also been some rotation of the tool actuator 41 about the pitch axis. While FIGS. 2–5 show only upper and lower arm sections, these arm sections could be further subdivided into a plurality of arm sections, each controlled by individual motors and having separate connecting joints. The present invention features upper and lower arm sections with a uniaxial elbow joint, a triaxial shoulder joint and a biaxial wrist joint if the tool interface spin axis is counted, or a uniaxial wrist joint if the tool interface spin axis is not counted.

Figure 6:
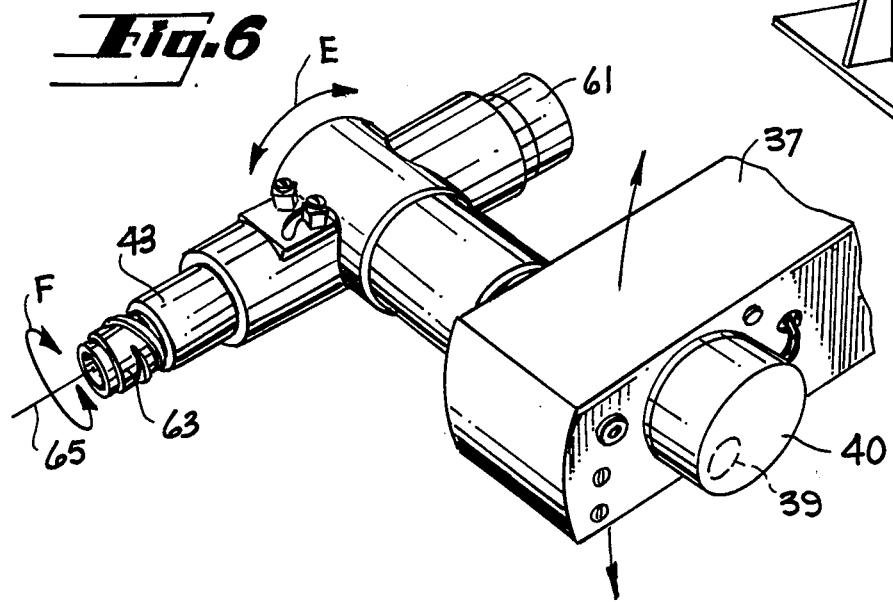
FIG. 6 is a perspective view of a detail view of the robot wrist of the present invention.

The biaxial nature of the wrist joint may be seen more clearly with reference to FIG. 6. FIG. 6 features a tool interface 43 having an encoder 61 at the back end thereof. As previously mentioned, the tool interface is mounted to lower arm 37, a gear box, by means of a shaft 39 along the lower arm pitch axis such that the tool actuator can rotate as indicated by the arrows E along the pitch axis. The tool actuator includes a head 63 to which various tools can be mounted. Head 63 rotates axially about a spin axis 65 as indicated by arrows F. The rotary motion of the tool may be converted to linear motion by gears, so that the actuator can open jaws or clamping members for holding objects. Alternatively, bits or nut driving tools may be attached to the actuator. The encoder 61 is a light-weight optical encoder to minimize mass. Preferably, spin axis 65 will be in alignment with the point of intersection of the axes 51, 53 and 55 of the shoulder, although this is not essential. A rotating tool interface is not required, since hydraulic or pneumatic tools may be preferred. In such a case, the wrist can still be positioned as desired, but tool control is carried out separately.

The terms "upper" and "lower" used to describe sections of the robot arm, are relative and not intended to be understood in an absolute sense. The robot arm of the present invention could be mounted in various orientations where the terms upper and lower would be reversed.

I claim:

1. A robot arm of the anthropomorphic type having shoulder, elbow and wrist joints comprising,
    a base, an upper arm, a lower arm and a tool interface,
    a shoulder joint connecting the base to a first end of the upper arm, the shoulder joint having an upper arm sweep axis, an upper arm swivel axis perpendicular to the sweep axis and an upper arm roll axis, perpendicular to both the sweep and swivel axes, the roll, sweep and swivel axes intersecting at a fixed common point,
    an elbow joint connecting a second end, opposite the first end, of the upper arm to a first end of a lower arm, said elbow joint having an extension axis parallel to the swivel axis of the shoulder joint, and
    a biaxial wrist joint connecting a second end, opposite the first end, of the lower arm to the end effector, the wrist joint having a pitch axis parallel to the extension axis of the elbow joint and the swivel axis of the shoulder joint, whereby wrist joint roll motion is achieved by roll motion of the shoulder joint, said shoulder joint comprising a first bracket cantilevered from the base parallel to said roll axis, said frame having an overhang portion with an end region defining said sweep axis in vertical alignment therethrough and a second bracket having a first portion through which said sweep axis passes and a spaced apart region through which the plane formed by the swivel and roll axes passes.

2. A robot arm of the anthropomorphic type having shoulder, elbow and wrist joints comprising,
    a base, an upper arm, a lower arm and a tool interface, said base being a vertically mounted plate atop a stand with said shoulder joint cantilevered from said plate,
    a shoulder joint connecting the base to a first end of the upper arm, the shoulder joint having an upper arm sweep axis, an upper arm swivel axis perpendicular to the sweep axis and an upper arm roll axis, perpendicular to both the sweep and swivel axes, the roll, sweep and swivel axis intersecting at a fixed common joint, said shoulder joint comprising a first bracket and a second bracket, said first bracket cantilevered from the base parallel to said roll axis, said first bracket having a horizontal overhang portion with an end region defining said sweep axis in vertical alignment therethrough, said second bracket having a first horizontal portion through which said sweep axis passes and a spaced apart, vertical region through which the swivel and roll axes pass,
    an elbow joint connecting a second end, opposite the first end of the upper arm, to a first end of the lower arm, said elbow joint having an extension axis parallel to the swivel axis of the shoulder joint, and
    a biaxial wrist joint connecting a second end, opposite the first end of the lower arm, to the end effector, the wrist joint having a pitch axis parallel to the extension axis of the elbow joint and the swivel axis of the shoulder joint, whereby wrist joint roll motion is achieved by roll motion of the shoulder joint, said end effector having an axis of spin perpendicular to the pitch axis of the wrist joint.

* * * * *